US012773871B2

(12) United States Patent
Cappellotto

(10) Patent No.: US 12,773,871 B2
(45) Date of Patent: Oct. 27, 2026

(54) SELF-LOCKING NIPPLE FOR SPOKES OF SPOKED WHEELS AND METHOD FOR MANUFACTURING SUCH A NIPPLE

(71) Applicant: ALPINA RAGGI S.P.A., Lomagna (IT)

(72) Inventor: Guido Cappellotto, Arcore (IT)

(73) Assignee: ALPINA RAGGI S.P.S., Lomagna (IT)

( * ) Notice: Subject to any disclaimer, the term of this patent is extended or adjusted under 35 U.S.C. 154(b) by 598 days.

(21) Appl. No.: 18/035,042

(22) PCT Filed: Oct. 27, 2021

(86) PCT No.: PCT/IB2021/059934

§ 371 (c)(1),
(2) Date: May 2, 2023

(87) PCT Pub. No.: WO2022/101730

PCT Pub. Date: May 19, 2022

(65) Prior Publication Data

US 2024/0010026 A1 Jan. 11, 2024

(30) Foreign Application Priority Data

Nov. 10, 2020 (IT) ........................ 102020000026849

(51) Int. Cl.
*B60B 1/04* (2006.01)

(52) U.S. Cl.
CPC .............. *B60B 1/044* (2013.01); *B60B 1/041* (2013.01); *B60B 1/045* (2013.01); *B60B 2310/305* (2013.01)

(58) Field of Classification Search
CPC ......... B60B 1/043; B60B 1/044; B60B 1/045; B60B 1/046
See application file for complete search history.

(56) References Cited

U.S. PATENT DOCUMENTS

| | | | | |
|---|---|---|---|---|
| 1,893,067 | A | 1/1933 | Arenz | |
| 2,778,690 | A * | 1/1957 | Horling, Jr. | B60B 1/045 301/58 |
| 5,904,461 | A | 5/1999 | Mckarge, Jr. | |
| 6,205,664 | B1 | 3/2001 | Cappellatto | |

(Continued)

FOREIGN PATENT DOCUMENTS

| | | | |
|---|---|---|---|
| EP | 1559582 | A1 | 8/2005 |
| WO | 2004065138 | A1 | 8/2004 |

(Continued)

*Primary Examiner* — Jason R Bellinger
(74) *Attorney, Agent, or Firm* — Carmel Patent Agency; Robert Ballarini

(57) ABSTRACT

A nipple for spokes of spoked wheels includes a rod with an axial development, a threaded hole which is formed axially in the rod, the thread of the hole defining a root diameter and a crest diameter, a head which is widened with respect to the rod and a deformable insert which is inserted in a seat which is axially aligned with the hole and which is constructed in an axially intermediate position thereof. The insert, at least when it is inserted in the seat, has a passage for a threaded spoke end, the internal diameter of which is less than the root diameter of the thread of the hole so as to interfere with the thread of the spoke when it is screwed into the threaded hole.

17 Claims, 4 Drawing Sheets

(56) References Cited

U.S. PATENT DOCUMENTS

| | | | | |
|---|---|---|---|---|
| 6,378,405 | B1 * | 4/2002 | Miller | B25B 13/485 81/448 |
| 7,137,671 | B2 * | 11/2006 | Passarotto | B60B 1/041 301/58 |
| 9,844,976 | B2 * | 12/2017 | Cappellotto | B60B 1/044 |
| 11,433,699 | B2 * | 9/2022 | Meggiolan | B60B 31/02 |
| 11,584,154 | B2 * | 2/2023 | Cappellotto | B60B 1/044 |
| 2005/0141986 | A1 * | 6/2005 | Flesher | B25B 13/485 411/403 |
| 2008/0054710 | A1 * | 3/2008 | Spahr | B60B 21/025 301/58 |
| 2008/0290721 | A1 * | 11/2008 | Wang | B60B 21/04 301/58 |
| 2012/0299365 | A1 * | 11/2012 | Cappellotto | B60B 1/045 301/58 |

FOREIGN PATENT DOCUMENTS

| | | | |
|---|---|---|---|
| WO | 2011086523 | A1 | 7/2011 |
| WO | 2012113599 | A1 | 8/2012 |

* cited by examiner

SELF-LOCKING NIPPLE FOR SPOKES OF SPOKED WHEELS AND METHOD FOR MANUFACTURING SUCH A NIPPLE

FIELD OF THE INVENTION

The present invention relates to a self-locking nipple for spokes of spoked wheels and a method for manufacturing such a nipple.

BACKGROUND

Nipples of the self-locking type are widely used in the construction of spoked wheels in order to prevent the loosening of the nipple which is screwed to the spoke without using thread-locking liquids and the like.

A self-locking nipple which is known and particularly appreciated in the field of cycling and motorcycling is described in U.S. Pat. No. 6,205,664 from the same Applicant.

Other nipples of the same type are described in EP2525985, WO2004/065138 and WO2012/113599.

All the above-mentioned nipples have a threaded axial seat, at one end of which, generally in the region of the head of the nipple, there is applied an insert made of deformable resin, generally a polyamide resin. The insert is bored so as to define a passage, the internal diameter of which is less than the crest diameter of the thread of the spoke. In this manner, when the spoke is screwed in the nipple, it deforms the walls of the passage of the insert while being inserted therein with an interference fit.

This interference produces the desired locking between the thread of the spoke and the nipple, preventing the accidental unscrewing thereof.

In all the above-mentioned cases, the insert is applied to an axial end of the nipple, generally the end furthest away from the rod of the nipple itself. This involves the spoke having to be long enough to reach the insert and to be introduced into the passage thereof because otherwise the self-locking effect of the nipple would inevitably not be provided.

In order to ensure that this is brought about, it is necessary to construct spokes which are needlessly long and in particular to process the threaded end over a significant portion so that the thread of the spoke can engage with the entire length of the thread of the nipple and become completely inserted in the passage of the insert made of resin.

Therefore, this technique requires a certain waste of material of the spoke, a greater overall weight of the wheel and in particular a weight which is distributed at the distal ends of the spokes with respect to the hub, which in turn causes undesirable inertia effects, and a great expenditure of energy and wear of the tools for processing spoke portions which in reality do not contribute to the mechanical resistance of the wheel.

A self-locking nipple for the spokes of a bicycle wheel, wherein the insert is applied in an intermediate axial position of the nipple, is known from EP1559582A1. However, it is evident that, as a result of the over-dimensioning of the insert with respect to the diameter of the threaded hole of the nipple, the axial insertion process of the insert into the nipple presents substantial difficulties, particularly when considering the fact that the material of the insert has to provide a given resistance to deformation in order then to also ensure adequate engagement with the thread of the spoke following repeated screwing and unscrewing operations thereof.

On the contrary, it would be desirable to provide a self-locking nipple, in which the insert can be applied rapidly and precisely by means of a repeatable process.

Furthermore, it must be observed that the nipple described in EP1559582A1 can be maneuvered only by means of a tool which extends axially from the head of the nipple itself. Therefore, this nipple cannot be maneuvered without at least partially disassembling the wheel.

On the contrary, it would be desirable to provide a self-locking nipple which allows adjustment of the tension of the respective spoke without having to disassemble the wheel.

The technical problem addressed by the present invention is to provide a self-locking nipple for spokes of spoked wheels which is structurally and functionally configured to at least partially overcome one or more of the disadvantages set out with reference to the cited prior art.

SUMMARY

This problem is solved by the invention by means of a nipple for spokes of spoked wheels including one or more of the features mentioned in the appended claims.

In one embodiment, the nipple includes a rod with an axial development, a threaded hole which is formed axially in the rod, the thread of the hole defining a root diameter and a crest diameter, a head which is widened with respect to the rod and a deformable insert which is inserted in a seat which is axially aligned with the hole, the insert, at least when it is inserted in the seat, having a passage for a threaded spoke end, the internal diameter of which is less than the root diameter of the thread of the hole so as to interfere with the thread of the spoke when it is screwed into the threaded hole. Preferably, the seat is formed in an intermediate position of the hole and, even more preferably, in a position with spacing from the head, that is to say, between the head and an axially opposite opening of the threaded hole.

It may be noted that, in this context, the term “intermediate position” of the hole is preferably intended to be understood to be an axial intermediate position of the hole.

In one embodiment of the invention, the passage of the insert, when it is inserted in the seat, has an internal diameter which is approximately identical to the crest diameter of the thread of the hole and so as to generate an interference fit with the thread of the spoke.

Preferably, the seat for receiving the insert has such a radial depth that the insert is retained axially in the seat.

It is also preferable for the insert to be radially contractile, in particular in a resilient manner, in order to allow it to be inserted in the respective seat from the exterior, through the axial hole of the nipple.

This radial contractility is improved if the insert has a discontinuous body and is preferably cylindrical and even more preferably has a body which is interrupted circumferentially by a notch in order to promote the radial contraction thereof. It may be noted that, in this context, the term “body” is preferably intended to be understood to be the wall of the insert and more particularly the cylindrical wall thereof.

As a result of the discontinuity of the body, the insert has a generous radial contractility which allows an easy and precise axial insertion of the insert itself in depth through the threaded hole of the nipple, without however that the aforementioned radial contractility presupposes that the insert is constructed from a particularly yielding material.

As a result of the radially contractile nature provided by the discontinuity of the body, therefore, it is also possible to construct the insert from a rather tough material, such as, for example, Nylon, which has the advantage of also withstanding repeated screwing and unscrewing actions of the spoke.

In one embodiment, the insert has a metal core which can improve the elastic return thereof once it has been inserted in the respective seat. Therefore, the metal core has the value of increasing the precision and repeatability of the process of inserting the insert in the respective seat.

The core is preferably arranged circumferentially and is also interrupted at the notch of the body.

A preferred material for constructing the metal core of the insert is harmonic wire or spring steel.

Advantageously, the insert is constructed from plastics material, preferably from Nylon.

A preferred method for manufacturing a nipple according to the invention comprises the steps of:

- providing a semi-finished product which is formed so as to define a rod and a head which is widened with respect to the rod;
- axially drilling the semi-finished product;
- forming in the drilled axial hole a seat for a deformable insert, the seat being constructed in an intermediate position of the hole which is spaced apart from the head;
- tapping the axial hole;
- inserting a radially contractile insert in the seat.

BRIEF DESCRIPTION OF THE DRAWINGS

The features and advantages of the invention will be better appreciated from the following detailed description of a preferred though non-exclusive embodiment which is illustrated by way of non-limiting example with reference to the appended drawings, in which.

DETAILED DESCRIPTION OF THE PREFERRED EMBODIMENTS

Figure 1:
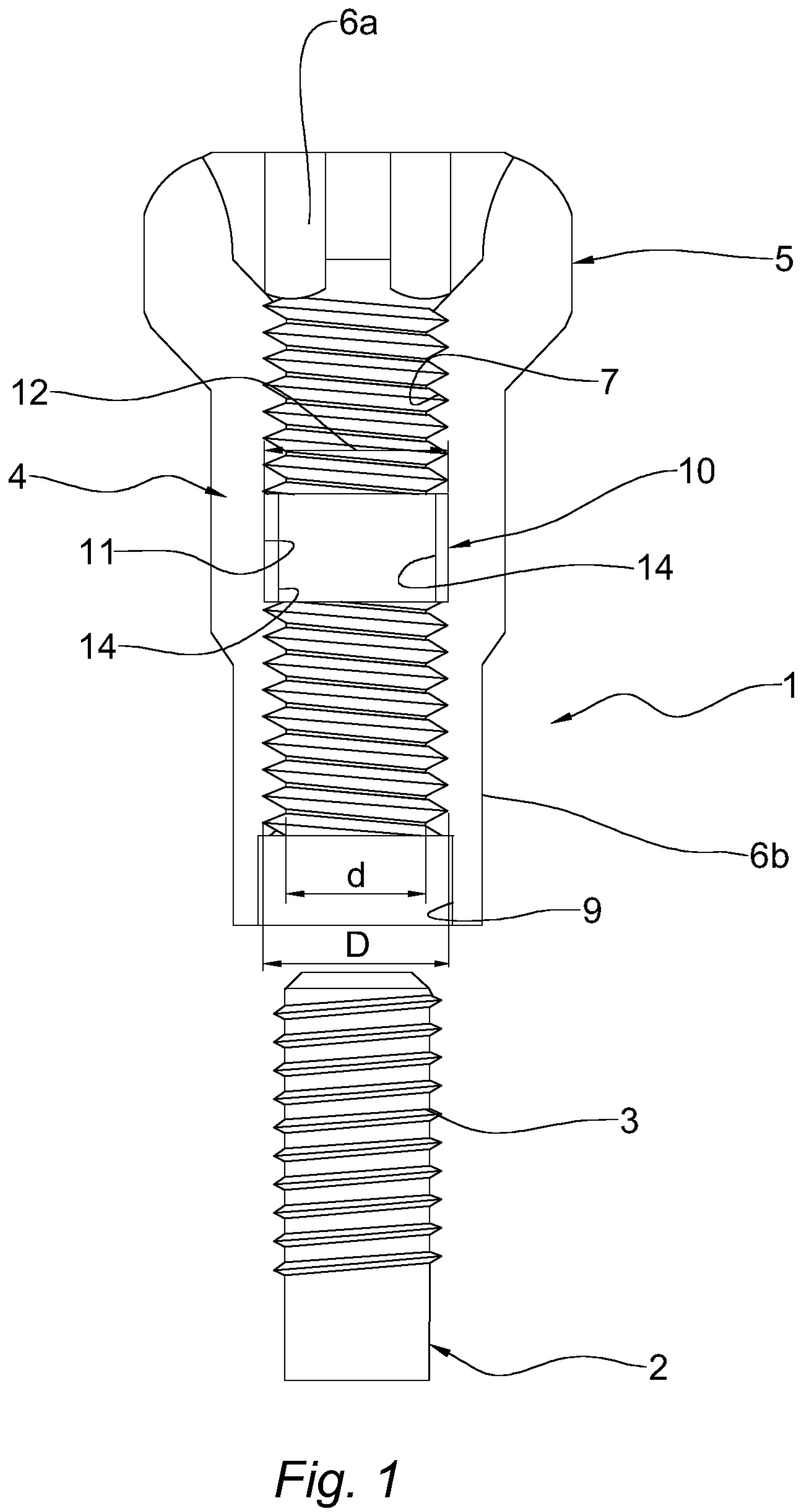
FIG. 1 is a view of a nipple and a portion of a spoke according to the present invention, in which the nipple is illustrated as an axial section.

In the Figures, there is generally designated 1 a nipple which is manufactured according to the present invention. The nipple 1 is intended to be applied to the threaded end 3 of a spoke 2 in order to construct a spoked wheel which is not illustrated.

The nipple 1 comprises a rod 4 and a head 5 which is widened with respect to the rod 4. There are preferably formed in the head and in the rod respective maneuvering keys 6*a*, 6*b* in order to rotate the nipple 1 with respect to the spoke for screwing purposes. The first maneuvering key 6*a* is preferably built in an axial recess of the head 5 (but may also be constructed, for example, by conferring a polygonal shape to the head itself) and may have different forms which are known per se, for example, with a hexagon socket, a torqx profile, Philips profile, notched profile, and the like. In this manner, the nipple can be maneuvered by means of a tool which extends from the first maneuvering key 6*a* along the axis of the nipple.

Figure 2:
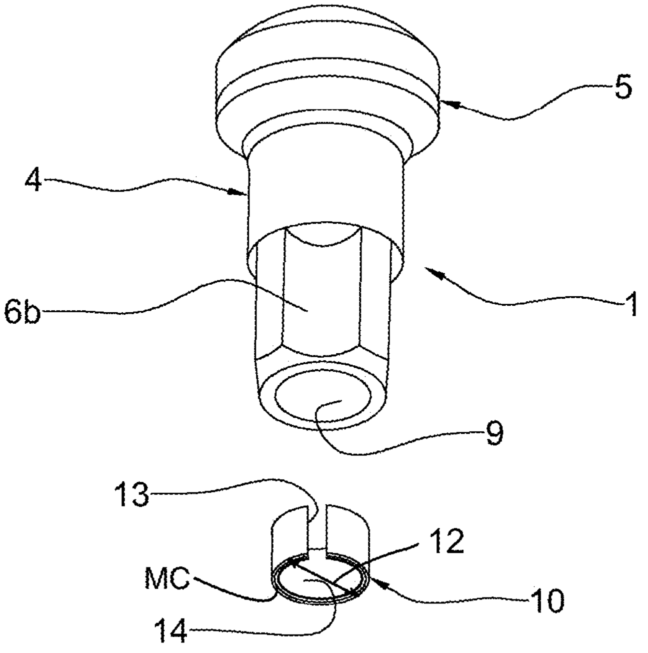
FIG. 2 is an exploded view of the nipple of FIG. 1.

The second maneuvering key 6*b* is preferably constructed in the form of a polygonal impression (for example, a square impression, as shown in FIG. 2 or a hexagonal impression) in the portion of the rod axially opposite and distal with respect to the head 5. In this manner, the nipple is also accessible and maneuverable when it is mounted on the wheel so as to allow adjustment of the tension of the spoke without having to disassemble the wheel, by means of a tool which extends from the second maneuvering key 6*b* in a direction transverse to the axis of the nipple.

The nipple further has a tapped axial hole 7, preferably a through-hole (or, alternatively, a blind hole) which extends from an opening 9 to the distal end with respect to the head 5 as far as the seat of the first maneuvering key 6*a*. The thread of the hole 7 defines a root diameter D and a crest diameter d.

The nipple 1 is further provided with an insert 10 made from deformable resin, for example, a polyamide resin.

The insert 10 is preferably formed with a cylindrical tubular (annular) shape which is radially contractile so as to be able to be installed from outside in a seat 11 which is formed in the hole 7 in an intermediate position thereof between the head 5 and the opening 9. The seat 11 preferably has a shape with a cylindrical body and has a diameter 12 which is preferably greater than the crest diameter d and even more preferably greater than or equal to the root diameter D of the thread. In this manner, the radial depth of the seat 11 is such that the insert 10 is axially retained in the seat 11. The seat 11 further has an axial extent which is sufficient to receive and retain the insert 10.

In order to make the insert 10 radially contractile, there is provision for it to be constructed with a discontinuous body, for example, by providing a notch 13. Alternatively, there is provision for using the resilience of the insert 10 itself or a multiplicity of partial discontinuities in the body thereof.

There is defined in the insert 10 a passage 14, the internal diameter of which, at least when it is inserted in the seat 11, is less than the root diameter of the thread of the hole 7 so as to interfere with the thread 3 of the spoke 2 when it is screwed in the threaded hole 7. This generates the self-locking connection between the spoke and nipple.

The seat 11 is preferably formed in a position of the hole 7 which is axially intermediate between the head 5 and the opening 9. This positioning allows the use of shorter spokes with respect to what is required by the known self-locking nipples, in any case ensuring both an optimum self-locking function and correct sealing of the spoke/nipple connection. In order to allow this connection, the seat 11 is spaced apart from the opening 9 of the nipple by at least three or more threads.

In some embodiments, in order to promote the widening of the insert 10 once it is inserted in the seat 11, there is provision for a metal core MC to be present in the mass of resin, for example, made of harmonic steel wire which is preferably arranged circumferentially and embedded in the insert 10 at an approximately median diameter thereof. In this manner, the insert 10 is radially contracted for the insertion thereof in the seat 11 but is urged both by the elastic return thereof and by the elastic return of the metal core to expand radially once it is released in the seat 11.

The metal core is also interrupted at the notch 13 of the insert 10.

In order to construct the nipple, a semi-finished product S which is obtained by molding from a metal rod which is straightened and cut beforehand is taken as a basis; the semi-finished product S is formed so as to define the external geometries of the nipple, including the head 5, the rod 4 and the respective maneuvering keys 6*a*, 6*b*.

Figure 3:
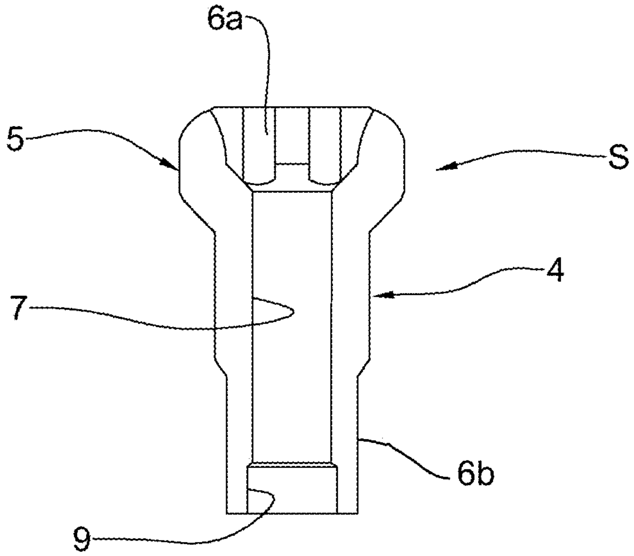
FIGS. 3 to 7 are schematic views of the nipple of the preceding Figures in different steps of the manufacture thereof.

The semi-finished product S is therefore axially drilled so as to obtain the hole 7 and the opening 9, as shown in FIG. 3.

Figure 4:
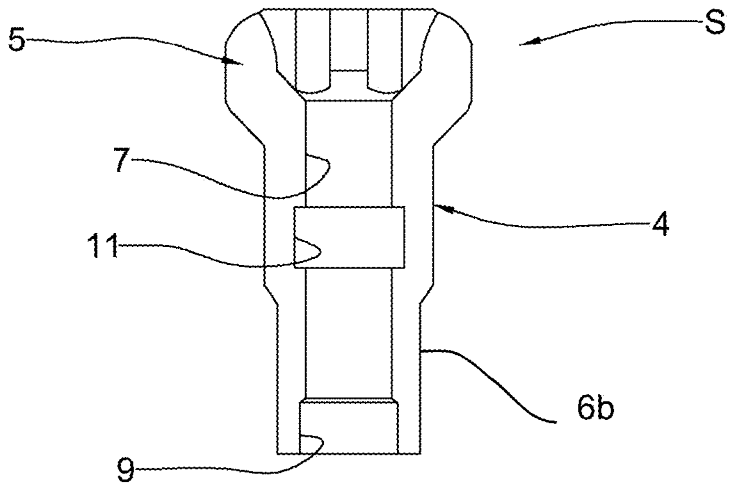
Figure 5:
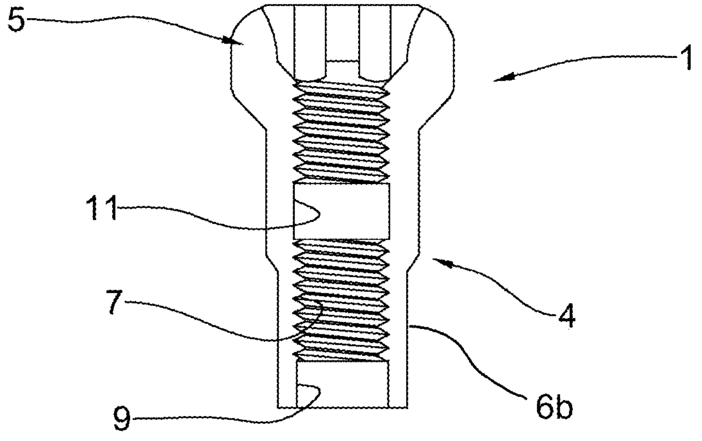

The processing of the seat 11 is then carried out, as shown in FIG. 4, and the tapping of the hole 7, as shown in FIG. 5.

Figure 6:
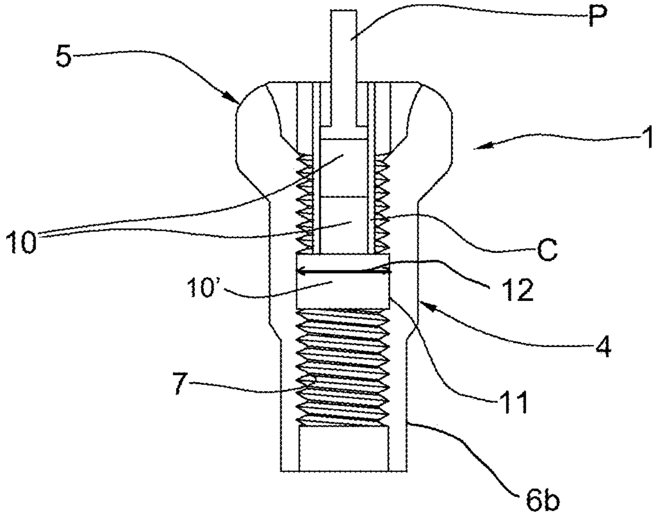

Meanwhile, the insert is provided in a radially contracted condition in a loader C, the external diameter of which is less than the crest diameter d of the thread of the hole 7 so as to be able to be introduced, preferably from the head 5 side, inside the hole 7 up to a location near the seat 11, as shown in FIG. 6.

In order to increase the precision and the repeatability of the application process of the insert 10 in the nipple, it is preferable for the insert to have a discontinuous mantle (so as to improve the radial contraction of the insert 10 when it is inserted in the loader C) and a metal core (so as to improve the elastic return of the insert once it is inserted in the respective seat 11, as depicted by 10' in FIG. 6).

The radially contracted insert is therefore placed in the seat 11, where it expands radially, regaining an external diameter identical to that of the seat 11 itself so as to remain embedded in the seat between the shoulders formed by the end threads of the hole 7 close to the seat 11 itself.

Figure 7:
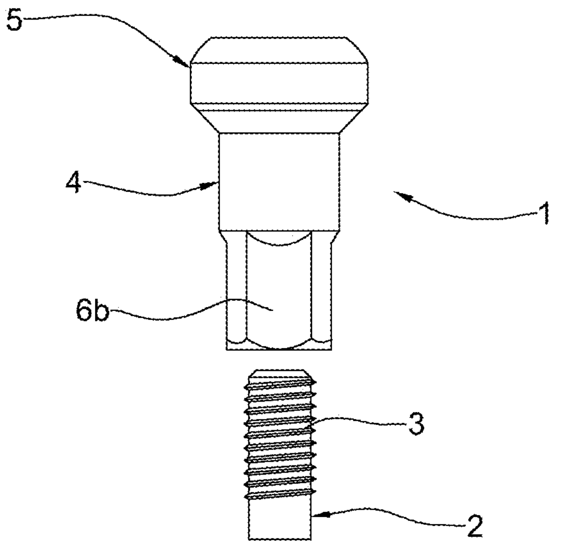

FIG. 7 shows the nipple 1 ready to receive the threaded end 3 of a spoke 2. When the nipple is screwed onto the threaded end 3 of the spoke 2, the thread of the spoke is screwed into the thread of the nipple until reaching the insert 10.

The screwing action then continues in the passage 14 of the insert, deforming the plastics material of the insert as a result of the interference effect between the internal diameter of the insert and the thread of the spoke. At the limit, it is sufficient for the length of the spoke to be such as to be at least partially screwed in the insert 10 of the nipple in order to obtain a self-locking connection. However, it is preferable for the length of the spoke to be selected so that the nipple is screwed on the spoke, with the wheel mounted, with engagement of both the threaded portions of the hole 7 separate from the seat 11.

It is preferable for the loader C to be constructed so as to contain a plurality of inserts 10 which can therefore be placed one at a time in the respective seats 11 of nipples being processed following the sliding thereof into the loader C via the force being applied thereto by means of a piston P.

The invention thereby solves the problem proposed, at the same time achieving a number of advantages, including:

- greater safety because a self-locking connection is obtained between the spoke and the nipple even in cases in which the threaded end of the spoke does not reach the head of the nipple,
- possibility of reducing the longitudinal extent of the spoke with a resultant saving of material and a reduction of the weight distributed at the distal ends of the spokes with respect to the hub,
- simplicity of the method for manufacturing the nipple.

The invention claimed is:

1. A nipple for spokes of spoked wheels comprising:

a rod, which extends axially, the rod comprising a threaded hole which extends longitudinally through the rod, the thread of the hole defining a root diameter and a crest diameter, a head which is widened with respect to the rod and a deformable insert having an external diameter, wherein said insert comprises a first external diameter and a second external diameter, wherein the second external diameter is greater than the first external diameter, and wherein the first external diameter corresponds to a first configuration in which the insert is inserted in a loader in a circumferentially contracted condition, the second external diameter corresponding to a second configuration in which the insert is inserted in a seat located in an intermediate longitudinal position of the threaded hole, wherein said first configuration allows the insert to be inserted inside an inner diameter of the loader, said loader having an external diameter, which is less than the crest diameter of the thread of the hole, wherein in said second configuration the insert, at least when inserted in the seat, permits passage of a threaded spoke end therethrough, the insert having an internal diameter which is less than the root diameter of the thread of the hole to interfere with the thread of the spoke when the spoke end is screwed into the threaded hole, wherein the seat is coaxial with the hole, wherein the insert is circumferentially contractile and has a discontinuous body, wherein the insert is made circumferentially contractile by the discontinuous body.

2. The nipple according to claim 1, wherein the passage of the insert, when the insert is inserted in the seat, has an internal diameter, which is approximately identical to the crest diameter of the thread of the hole.

3. The nipple according to claim 1, wherein the seat for receiving the insert is dimensioned to retain the insert in the seat.

4. The nipple according to claim 1, wherein the insert is cylindrical and has a body which is interrupted circumferentially by a notch.

5. The nipple according to claim 1, wherein the insert is constructed from a plastic material.

6. The nipple according to claim 5, wherein the insert is made from Nylon.

7. The nipple according to claim 1, wherein the insert has a metal core.

8. The nipple according to claim 7, wherein the metal core is arranged circumferentially and is also interrupted at the notch of the mantle.

9. The nipple according to claim 7, wherein the metal core of the insert is constructed from harmonic wire or spring steel.

10. The nipple according to claim 1, wherein the head and the rod comprise respective maneuvering keys.

11. The nipple according to claim 10, wherein a first maneuvering key is built in an axial recess of the head.

12. The nipple according to claim 11, wherein a second maneuvering key is constructed in the portion of the rod axially opposite and distal with respect to the head.

13. A method for manufacturing a nipple according claim 1, comprising:

providing a semi-finished product which is formed to define a rod and a head which is widened with respect to the rod;

axially drilling the semi-finished product;

providing a circumferentially contractile insert which has a discontinuous body mantle;

forming in the drilled axial hole a seat for the circumferentially contractile insert, the seat being constructed in an intermediate position of the hole which is spaced apart from the head;

tapping the hole; and inserting the circumferentially contractile insert in the seat;

providing a loader, wherein the loader has an external diameter which is less than the crest diameter of the thread of the hole; and introducing the insert in a circumferentially contracted condition in the loader inside the hole up to the seat.

14. The method according to claim 13, further comprising:

forming the semi-finished product so as to define the external geometries of the nipple, including the head, the rod and respective maneuvering keys which rotate the nipple with respect to a spoke for screwing purposes.

15. The method according to claim 14, further comprising:

constructing a first maneuvering key in an axial recess of the head or by conferring a polygonal shape to the head itself.

16. The method according to claim 15, comprising constructing a second maneuvering key in the form of a polygonal impression in the portion of the rod axially opposite and distal with respect to the head.

17. The method according to claim 13, further comprising:

providing a piston and constructing the loader so as to contain a plurality of inserts to be placed one at a time in the respective seats of nipples being processed following the sliding thereof into the loader by the piston applying a force thereto.

* * * * *